United States Patent
Grey et al.

(10) Patent No.: US 8,633,608 B2
(45) Date of Patent: Jan. 21, 2014

(54) APPARATUS AND METHOD FOR EXTRACTING ENERGY FROM FLUID MOTION

(75) Inventors: Simon Grey, Inverness-shire (GB); Andrew Borthwick, Lanarkshire (GB)

(73) Assignee: AWS Ocean Energy Limited, Inverness (GB)

( * ) Notice: Subject to any disclaimer, the term of this patent is extended or adjusted under 35 U.S.C. 154(b) by 394 days.

(21) Appl. No.: 12/919,996

(22) PCT Filed: Feb. 27, 2009

(86) PCT No.: PCT/GB2009/000544
§ 371 (c)(1),
(2), (4) Date: Sep. 28, 2010

(87) PCT Pub. No.: WO2009/106836
PCT Pub. Date: Sep. 3, 2009

(65) Prior Publication Data
US 2011/0006532 A1    Jan. 13, 2011

(30) Foreign Application Priority Data
Feb. 28, 2008    (GB) .................................... 0803712.9

(51) Int. Cl.
*F03B 13/00*    (2006.01)

(52) U.S. Cl.
USPC ............................................. 290/53; 290/42

(58) Field of Classification Search
USPC .......................................... 290/53; 310/332
See application file for complete search history.

(56) References Cited

U.S. PATENT DOCUMENTS

| | | | | |
|---|---|---|---|---|
| 3,816,774 A * | 6/1974 | Ohnuki et al. | ................ | 310/332 |
| 4,145,882 A * | 3/1979 | Thorsheim | ...................... | 60/325 |
| 4,404,490 A | 9/1983 | Taylor et al. | | |
| 6,424,079 B1 * | 7/2002 | Carroll | .......................... | 310/339 |
| 6,559,550 B2 * | 5/2003 | Herman | ........................ | 290/1 R |
| 6,768,246 B2 * | 7/2004 | Pelrine et al. | ................. | 310/339 |
| 6,812,624 B1 * | 11/2004 | Pei et al. | ....................... | 310/309 |
| 7,362,032 B2 * | 4/2008 | Pelrine et al. | ................. | 310/309 |
| 7,394,182 B2 * | 7/2008 | Pelrine et al. | ................. | 310/328 |
| 7,538,445 B2 * | 5/2009 | Kornbluh et al. | ............... | 290/53 |
| 7,649,276 B2 * | 1/2010 | Kornbluh et al. | ............... | 290/53 |
| 7,696,634 B2 * | 4/2010 | Filardo | .......................... | 290/54 |
| 7,823,380 B2 * | 11/2010 | Ghouse | .......................... | 60/499 |
| 7,863,768 B2 * | 1/2011 | Filardo | .......................... | 290/54 |
| 7,898,152 B2 * | 3/2011 | Stocker et al. | ................ | 310/328 |
| 7,971,850 B2 * | 7/2011 | Heim et al. | .............. | 251/129.06 |

(Continued)

FOREIGN PATENT DOCUMENTS

DE    2650356 A *  5/1978
DE    4339307       5/1995

(Continued)

*Primary Examiner* — Joseph Waks
(74) *Attorney, Agent, or Firm* — Gifford, Krass, Sprinkle, Anderson & Citkowski, P.C.

(57) ABSTRACT

An apparatus and method are disclosed for extracting energy from fluid motion. A deformable body adapted to be deformed by fluid motion is arranged to drive at least one energy medium to be delivered to an energy output. The energy medium is controllable in order to control at least one dynamic response of the deformable body.

25 Claims, 5 Drawing Sheets

(56) References Cited

U.S. PATENT DOCUMENTS

| | | | |
|---|---|---|---|
| 7,980,071 B2 * | 7/2011 | Farley et al. | 60/398 |
| 8,074,939 B2 * | 12/2011 | Hyde et al. | 244/204 |
| 8,120,195 B2 * | 2/2012 | Pollack et al. | 290/53 |
| 8,459,028 B2 * | 6/2013 | Klassen et al. | 60/645 |
| 2007/0164641 A1 | 7/2007 | Pelrine et al. | |
| 2007/0257490 A1 * | 11/2007 | Kornbluh et al. | 290/53 |
| 2010/0019498 A1 | 1/2010 | Pollack et al. | |
| 2010/0314871 A1 * | 12/2010 | Jean et al. | 290/42 |

FOREIGN PATENT DOCUMENTS

| | | |
|---|---|---|
| EP | 0035346 | 9/1981 |
| EP | 1919071 A2 * | 5/2008 |
| GB | 2081387 A * | 2/1982 |
| GB | 2434840 | 8/2007 |
| RU | 2004837 C1 * | 12/1993 |
| SU | 1129407 A * | 12/1984 |
| WO | WO 8400583 A * | 2/1984 |
| WO | WO 2006067421 A1 * | 6/2006 |

* cited by examiner

APPARATUS AND METHOD FOR EXTRACTING ENERGY FROM FLUID MOTION

FIELD OF THE INVENTION

The present invention relates to an apparatus for extracting energy from fluid motion, such as a fluid motion generator, and in particular, but not exclusively, to a fluid motion generator driven by wave or tidal motion within a fluid body.

BACKGROUND TO THE INVENTION

Many systems exist for extracting useful forms of energy from renewable sources, such as waves, tides, wind and the like. For example, it is known in the art to convert ocean wave power to a useful form using flexible or elastic bodies, including tubes, balloons, membranes and the like. These systems are typically arranged such that the hydrodynamic pressures exerted by water waves result in changes in pressure within a contained fluid or gas. These captive pressure variations are then subsequently converted to mechanical power via various mechanisms (e.g. turbines, pistons and the like) with mechanical power then being converted to electricity or high pressure water by means of a generator, pump or similar.

GB 2 434 840, for example, discloses such a device in the form of a tubular wave energy converter. Oscillating pressure of seawater outside the tube wall due to ocean waves creates a localised pressure gradient across the tube wall relative to the sea water inside the tube. The walls of the tube have a high elasticity so that they can distend in response to the pressure gradient, so inducing a bulge wave within the tube. The bulge wave has a natural propagation speed within the tube dictated by the tube's distensibility. If the propagation speed of the bulge and ocean waves match, resonant energy transfer takes place as the bulge wave "surfs" the exciting ocean wave. Thus, the bulge wave progressively sucks energy from the ocean wave resulting in a progressive increase in amplitude of the bulge wave. The distensibility of the tube is fixed and designed in order to match the bulge wave propagation velocity with the predominant expected ocean wave velocity, thus maximising average wave energy absorption. The energy accumulated in the bulge wave is eventually converted into useable form via a power take-off apparatus or process located at one or both ends of the tube.

However, in such known distensible tube arrangements, the distensibility of the tube and hence the speed of the bulge wave are fixed. Thus, the tube will respond well to some frequencies of wave but not so well to others. In reality ocean waves have widely varying frequencies and hence the tube will not be matched to incident conditions. This will limit the overall average energy abstraction.

Additionally, it is known that the bulge wave grows as it propagates along the tube and energy is accumulated along the length of the tube. Accordingly, a thicker tube wall is necessary to accommodate the stored energy, with attendant additional weight, manufacturing and handling difficulties and cost. There may be distortion of the bulge wave due to gross deformation of the tube.

Furthermore, the bulge wave may saturate before it reaches the end of the tube. Thus, a portion of the length of the tube may be redundant and does not contribute to energy generation.

Additionally, features of the device, such as the power take off apparatus, may not be matched to the dynamic response of the tube, and as such reflections may occur. These reflections may serve to lower or limit the size and energy stored by the bulge wave through destructive interference, reducing the energy capture of the device.

There are a multitude of wave energy converters that achieve effective absorption of energy. Conversion to useful power, however, remains a significant challenge which has not yet been satisfactorily met by the art. Numerous machines and processes exist but these all suffer from reliability problems inherent in electro-mechanical equipment exposed to a harsh environment such as the sea. In addition, the majority of known power take-off systems do not permit good efficiencies to be achieved.

SUMMARY OF THE INVENTION

A first aspect of the present invention relates to an apparatus for extracting energy from fluid motion, said apparatus comprising:

a deformable body adapted to be deformed by fluid motion, wherein the deformation of the deformable body is arranged to drive at least one energy medium to be delivered to an energy output;

and wherein the energy medium is controllable in order to control at least one dynamic response of the deformable body.

In use, by controlling the dynamic response, the output and operation of the apparatus may be optimised or tailored. The motion of the fluid systems from which the apparatus extracts energy may be variable and as such, by employing an apparatus whose dynamic response is adjustable in response to changes in the fluid system or the demands that the user places on the apparatus, i.e. a smart structure, then the utility of the apparatus is greatly increased. In this way, the deformable body may be tuned in accordance with the ambient fluid motion or conditions. For example, the deformable body may be tuned to permit deformation at a frequency that corresponds to a forcing frequency from the effect of fluid motion. This may therefore permit resonance of the entire system to be achieved to therefore maximise the energy transfer into the deformable body.

The control of the energy medium may be active and/or passive control.

The apparatus may comprise a controller for controlling the energy medium. The controller may be arranged to tune a dynamic response of the deformable body.

The dynamic response may be defined by the desired effective stiffness, effective damping or effective inertia of the deformable body.

The controller may be in communication with at least one sensor for sensing a dynamic response of the deformable body. The controller may be arranged to control the dynamic response of the system at least partially based on the output of at least one sensor. The at least one sensor may be embedded or intrinsically bonded to the deformable body.

The sensor may measure strain, and or its derivatives.

The sensor may be connected to a communication means. The communication means may be embedded within, or continuously bonded to, or intrinsic to the deformable body.

The at least one sensor may be adapted to provide multi-spatial sensing. The multi-spatial sensing may enable condition monitoring and or fault detection. The multi-spatial sensing may enable more robust control by reducing phase delay of feedback circuit, for example, by reducing averaging windows, and or enabling predictive control.

The sensors may be arranged to provide distributed sensing. This may enhance redundancy and therefore resilience of the device.

The deformable body may be arranged to drive at least one energy medium within the apparatus. The energy medium may be within walls of the deformable body.

The deformable body may be designed such that it passively resonates at a desired frequency for optimal energy extraction. In this way, the reactive power delivered by the force transducers may be minimised.

The energy medium may be arranged such that it passively resonates at a frequency matched to the passive mechanical resonance of the deformable body. This may allow energy extraction to be optimized.

The energy medium may have tuning elements such that the resonant point may be controlled to match to a desired oceanic forcing frequency.

The system of the present invention may be arranged so that the energy medium is indirectly driven by fluid motion via deformation of the deformable body, i.e. fluid motion deforms the deformable body and the deformation of the body is then used to drive an energy medium. In this way, the energy can be delivered in a controlled and consistent manner. This contrasts with prior art systems, wherein energy is directly induced in an energy carrying medium, such as a bulge wave, by fluid motion.

The fluid motion may induce cyclical motion of the deformable body and thus the driving of the energy medium may be repeatable and sustainable.

The energy output may comprise energy take-off apparatus. The energy take-off apparatus may comprise an electrical connection such as an electrical connection to a grid or electricity distribution system. The energy take-off apparatus may comprise a generator and/or a pump and/or an energy storage device and/or the like.

The deformable body may comprise at least one facilitator for transferring the energy of the fluid motion to the energy medium. The facilitator may be a force transducer. However, it will be recognised that the use of force transducer herein relates to any means that transfers energy from the fluid motion to the energy medium. The original and final energy forms may be the same. For example the force transducer may convert fluid motion in one liquid into fluid motion in another liquid.

The force transducer may be deformable. The force transducer may be adapted to be deformed by fluid motion. The force transducer may be arranged such that deformation of the force transducer drives the energy medium.

The deformable body and/or force transducer distribution may be configured such that energy is continuously delivered to the energy output whilst said body is being deformed.

At least one force transducer may be operable as a sensor.

Additionally or alternately, the deformable body may be provided with one or more actuators. The deformable body may be positively displaced by active control of the force transducer and/or actuator.

The force transducer may comprise an electroactive polymer. The energy medium may comprise electrical charge. The body may comprise an electroactive material adapted to generate an electrical current upon deformation thereof. Thereby, the electrical charge may be driven by deformation of the electroactive polymer.

The electroactive material may comprise an electroactive polymer material. Such electroactive polymer materials are known in the art. However these materials have heretofore conventionally been used in transducer applications that require electroactive polymer materials to be secured relative to a fixed frame.

The facilitator may comprise at least one conduit. The conduit may be embedded within or intrinsic to the deformable body. The deformable body may be arranged to be deformed by at least a first fluid. The energy medium may comprise a fluid, which may be a second fluid. The second fluid may differ from, or be the same as, the first fluid. At least part of the deformable body may comprise at least one conduit. The at least one conduit may be arranged to receive the second fluid.

The at least one conduit may be coupled to driven apparatus. The driven apparatus may comprise a hydraulically driven electrical generator or a hydraulic pump or a hydraulically driven actuator or an energy storage device or the like, or any combination thereof. The device may be arranged to receive fluid from the conduit. The device may be arranged to be driven by the received fluid. The driven apparatus may be arranged to be driven by fluid motion in at least two directions.

The conduit may be at least partially formed from a resiliently elastic material. The conduit may comprise electroactive polymer and/or electrical conductor. The conduit may be provided with reinforcement, such as cross-ply steel braid. This may allow the elasticity of the conduit to be relatively low whilst being capable of withstanding high pressure.

In embodiments where the energy medium comprises electrical charge, the conduit may be flexible and/or conducting.

The deformable body may be a body having at least one rigid surface, such as a metallic surface, and at least one elastic surface.

The deformable body may be provided with one or more valves, such as one-way valves or pressure control valves. One or more of the valves may be provided in the conduit. The valves may be located at one or both ends of the conduit, or within the conduit.

The conduit may be arranged in a coil, such as a concentric spiral or a helix. A screw axis of the conduit may be substantially along or aligned with a longitudinal axis of the generator.

The sections of conduit forming loops of a coil may be joined to sections of conduit forming an adjacent loop of a coil. The conduit may be embedded in at least one wall of the deformable body. The conduit may be adjacent to at least one wall of the deformable body. At least one wall of the deformable body may constrain the conduit. The at least one wall may at least partially form an inner and/or outer walls of the deformable body.

One or more conduits may comprise one or more linked fluid chambers.

The apparatus of the present invention may be adapted to be driven or actuated by motion of liquid, such as by wave motion, tidal motion, fluid currents, cascading fluids or the like, or any combinations thereof. Alternatively, or additionally, the apparatus may be adapted to be driven by motion of gas, such as winds or the like.

At least part of the deformable body may be adapted to be deformed by the effect of fluid motion. The fluid motion may be an oscillating motion and/or result in an oscillating motion in the deformable body. For example, the fluid motion may produce pressure or pressure variations, such as static and dynamic pressures and pressure variations, which may act against the deformable body to establish forces sufficient to deform said deformable body.

It should be understood that deformation of at least part of the deformable body applies to any deformation which stresses the deformable body, and as such includes, but is not limited to, any deformation which provides a change in the shape, position, configuration, orientation, size or the like of the deformable body. This deformation may be achieved by bending, extending, distending, stretching, compressing, articulating or the like, or any combination thereof.

The deformable body may be adapted to be at least partially submerged within a fluid body subject to fluid motion. In one embodiment the deformable body may be adapted to be completely submerged within a fluid body. For example, the deformable body may be disposed below a surface of a body of water. The deformable body may be moored within a fluid body. For example, the deformable body may be tethered to a bed of the fluid body, a floating structure, a fixed structure or the like. Alternatively, the deformable body may be freely disposed within a fluid body. In embodiments of the present invention the deformable body may be adapted to be towed or otherwise displaced within a fluid body.

In alternative arrangements the deformable body may be adapted to float or otherwise be positioned on or adjacent the surface of a fluid body.

The deformable body may comprise a flexible portion, wherein flexure of said flexible portion drives the energy medium, for example, by effecting a deformation of the force transducer. The flexible portion may be elastic, or in-elastic. The deformable body may comprise relatively moveable portions, wherein relative motion of said portions effects deformation of the force transducer. The relatively moveable portions may comprise a piston assembly, for example.

In one embodiment of the present invention the deformable body may define at least one fluid cavity. The fluid cavity may be adapted to contain a fluid, wherein forces, such as pressure forces, including static and dynamic pressure forces, acting on an outer surface of the deformable body may result in changes in pressure or the like within the contained fluid, thus effecting appropriate deformation of the deformable body and electroactive material.

The fluid cavity may be open to ambient fluid, and thus ambient fluid may communicated to and from the fluid cavity. Alternatively, the fluid cavity may be closed to ambient fluid. In this arrangement the fluid cavity may be adapted to contain any suitable fluid, such as a liquid or a gas.

The deformable body may be distensible. This arrangement may permit local changes in the area or volume of the fluid cavity to thus achieve effective deformation of the electroactive material and/or at least one conduit.

The deformable body may be adapted to permit the creation of bulge waves therein resulting from the effect of fluid forces acting against the deformable body. In one embodiment the deformable body may comprise a tubular structure. In this arrangement external forces acting against the deformable body may generate bulge waves within the deformable body, which propagate along the length thereof, continuously deforming the deformable body and electroactive material and/or at least one conduit. This arrangement may permit usable energy to be continuously extracted from a bulge wave, which is contrary to known systems in which the bulge wave must be permitted to increase in size and energy along the length of a tube and then discharge this energy through a conventional power take-off system. This therefore requires significant mechanical integrity to accommodate significant bulge waves.

At least one actuator and/or at least one force transducer may be arranged to initiate a bulge wave. Alternately, the apparatus may comprise a point absorber for initiating a bulge wave.

The deformable body may be arranged to form a waveguide for controlling propagation of a wave therein. The waveguide may be linear, multilinear or toroidal. The properties and/or dimensions and/or shape of the waveguide may be arranged to minimise reflections. The waveguide may be arranged to promote a particular frequency of wave within the deformable body.

The waveguide may be arranged to generate and/or control reflections so as to promote a particular frequency of a bulge wave, for example, by constructive interference, and/or increase the passive bandwidth of the deformable body. The waveguide may be provided with reflectors, which may be continuously distributed or located at one or more ends of the waveguide, for controlling reflections. At least a portion of the waveguide may be arranged to present an impedance to the bulge wave that matches the impedance of a driven apparatus, in order to minimise reflections from the driven apparatus, for example the waveguide may be terminated in an over damped section of waveguide with a closed end, of lumped impedance matched to the main waveguide to terminate the bulge wave without reflection.

In embodiments where the present invention is used or driven by wave motion, the tubular structure may be adapted to be aligned with the principal or predominant wave direction.

In embodiments where the invention is used or driven by fluid current motion, such as tidal flow, the tubular structure may be adapted to be aligned with the principal flow direction.

In both embodiments the tubular structure may be self-aligning in this respect, or may be positively aligned.

In alternative embodiments the deformable body may comprise a spherical structure, or the like, or any other suitable structure.

The fluid cavity may be at least partially defined by a wall of the deformable body. The wall of the deformable body may comprise, support or the like, the force transducer.

The wall of the deformable body may be partially or entirely formed of the force transducer. The force transducer may form or be arranged in at least one panel. The wall of the deformable body may comprise a single panel. Alternatively, the wall of the deformable body may comprise a plurality of panels. The panels may be arranged on or within the wall of the deformable body and in any orientation. In embodiments of the invention, the panels may be oriented in specific patterns. For example, one or more of the panels may be arranged along longitudinal and/or lateral axes of the deformable body. Alternatively, or additionally, one or more of the panels may be arranged along oblique axes of the deformable body. Aligning the panels in specific patterns may assist to maximise electrical current generation, and may assist to provide preferential control of the deformation of the deformable body. For example, aligning one or more of the panels obliquely may enable torsional responses/control of the deformable body.

In one embodiment the dynamic response of the deformable body may be altered to permit bulge wave propagation velocity to accurately match incident fluid velocity, such as wave velocity, fluid current velocity or the like. The dynamic response of the deformable body may be altered to permit the location of initiation and direction of travel of bulge waves.

The dynamic response of the deformable body may be arranged to apply a force to the bulge wave in phase or in quadrature, in order to provide augment reactive power or damping of the wave respectively.

The dynamic response of the deformable body may be altered to permit said body to oscillate in accordance with ambient fluid motion, such as wave motion. The motion of the deformable body may be controlled to establish in phase or out of phase harmonic motion with ambient fluid motion.

This may therefore permit the deformable body to be exposed to preferential pressure regimes and differentials or the like.

The deformable body may be provided with at least one stability device. The stability device may comprise a hydrodynamic surface, such as a fin or aileron, and/or at least one inelastic member and/or at least one buoyant member and/or a restraint or tether and/or a keel and/or ballast and/or drag device. The hydrodynamic surface may be arranged to provide vertical and/or horizontal and/or rotational stability. The hydrodynamic surface may be arranged to orient the apparatus in a preferred direction, such as in a direction of flow of a fluid current.

Additionally, it is understood in the art that continuous fluid currents, such as river currents, tidal currents or the like are subject to pulsating or oscillating phenomena. Accordingly, the present invention may permit tuning in accordance with such phenomena to therefore effectively be utilised in such flow regimes.

Control of the dynamic response of the deformable body may permit the electrical generator to be damped, for example in conditions of extreme fluid motion. Thus, the energy extraction apparatus may be permitted to be shut down or limited in output when ambient conditions near or exceed design limits.

In embodiments where the force transducer comprises electroactive polymer, the dynamic response of the deformable body may be adapted to be varied by active control of the electroactive material. In this arrangement the electroactive material may be adapted to receive an electrical current to deliver static and dynamic forces to the deformable body to effect positive displacement and/or vary the effective dynamic properties of the body.

In embodiments where the force transducer comprises one or more conduits, the dynamic response of the deformable body may be variable by active control of the fluid in at least one conduit. For example, the active control may be active control of properties of the fluid, such as the pressure of the fluid. In this arrangement, the pressure within the conduit may be controllable via operation of pressure control means coupled with at least one conduit. The pressure control means may comprise a pump, generator operated in reverse, throttle valve or the like, or any suitable combination thereof.

Control of the dynamic response of the deformable body may be incorporated in a feedback or dynamic control system adapted to continuously monitor and alter the mechanical properties in accordance with, for example, ambient fluid conditions. This therefore significantly differs from known systems in which the mechanical properties of, for example, distensible tube systems are fixed and cannot be changed during use, thus severely limiting their capabilities to accommodate changing ambient conditions. The deformable body may be adapted to be positively displaced in a desired manner. Motion or displacement of the deformable body may be established to maximise energy extraction. The deformable body may be positively displaced by active control of the force transducer. For example, where the force transducer comprises an electroactive material, the electroactive material may be adapted to receive an electrical current to effect a desired mechanical output of the electroactive material and thus of the deformable body. Where the force transducer comprises at least one fluid conduit, at least one conduit may be adapted to have its pressure controlled, for example, by a pump, a hydraulic generator operated in reverse, a throttle valve, or the like or any combination thereof, to effect a desired mechanical output of at least one secondary conduit and thus of the deformable body.

The apparatus may comprise at least one floatation arrangement, adapted to provide buoyancy. The floatation arrangement may be mounted relative to the deformable body. The floatation arrangement may comprise a buoyant material, such as foam. The floatation arrangement may comprise a chamber adapted to contain a gas, such as air or the like. In embodiments of the invention the floatation chamber may be at least partially elastic. Alternatively, or additionally, the floatation chamber may be at least partially flexible. This arrangement may therefore permit the floatation chamber to accommodate deformation of the deformable body.

The apparatus may comprise a ballast arrangement. The ballast arrangement may be adapted to permit a preferred orientation of the apparatus to be achieved.

The apparatus may comprise an electrical conductor adapted to conduct generated electrical current. The electrical conductor may communicate the generated electrical current and power to a remote location for subsequent use. For example, the electrical conductor may communicate electrical power to a power grid system, local electrical system, such as, for example, on an offshore vessel, oil rig or the like. Electrical conditioning systems may be provided to condition the generated electrical current and power for transmission and integration into desired user systems.

The system may comprise a conditioning system, which may be a protection system such as an overcurrent and/or overvoltage protection system and/or a pressure control system.

The deformable body may comprise fibres, which may be aligned in preferential directions to confer anisotropic material properties. The fibres may be flexible and may be inelastic. In this arrangement the fibres may permit deformation of the body in predetermined directions. The fibres may comprise Kevlar.

The fibres may comprise conducting fibres such as carbon fibres, metal filaments such as copper filaments and/or conducting polymer or polymer blended with conducting material. In this way, the fibres may be used to carry electricity generated by the apparatus. The fibres may form a knitted, woven or non-woven reinforcement. The fibres may be embedded in the deformable body. The fibres may be used to increase the resistance of the tube to damage, for example, due to bites from fish or collisions with water borne objects.

The fibres may be part of a matrix. The matrix materials may be laminated, and selected to confer the desired electrical and mechanical properties, and environmental compatibility. This may include a UV resistant surface.

According to a second aspect of the invention there is provided a method of extracting energy from fluid motion, said method comprising the steps of:

providing a deformable body, wherein the deformable body is arranged such that deformation of the body drives an energy medium to be delivered to an energy output;

exposing the deformable body to fluid motion;

permitting the fluid motion to deform the deformable body to thereby drive the energy medium; and controlling the energy medium in order to control at least one dynamic response of the deformable body.

The deformable body may be configured such that energy is continuously delivered to the energy output whilst said body is being deformed.

The motion may comprise an oscillating motion.

According to a third aspect of the present invention there is provided a fluid motion electrical generator comprising a deformable body, at least part of the deformable body being adapted to be deformed by fluid motion within a fluid body, wherein at least a portion of the deformable body comprises an electroactive material adapted to generate an electrical current upon deformation thereof and at least part of the electroactive material is controllable in order to control at least one dynamic response of the deformable body.

The electroactive material may be operable as an actuator, in order to control at least one dynamic response of the deformable body.

The motion may comprise an oscillating motion.

In use, the generator may effectively convert energy contained within or resulting from a moving fluid without relying on conventional power take-off systems and generators, such as turbines, hydraulic accumulators and the like. The present invention therefore provides a generator which does not require moving mechanical parts, significantly reducing complexities in manufacturing, installation, maintenance, efficiencies and the like, and associated costs.

The electroactive material may comprise an electroactive polymer material. Such electroactive polymer materials are known in the art. However these materials have heretofore conventionally been used in transducer applications which require electroactive polymer materials to be secured relative to a fixed frame.

According to a fourth aspect of the present invention there is provided a method of generating electricity from fluid motion, said method comprising the steps of:

exposing a generator comprising a deformable body to fluid motion, wherein the deformable body comprises an electroactive material;

permitting the fluid motion to deform the deformable body and the electroactive material;

controlling the electroactive material in order to control at least one dynamic response of the deformable body.

extracting electrical current generated by the electroactive material upon deformation thereof.

The motion may comprise an oscillating motion.

The electrical generator according the third aspect may be utilised in the methods according to the second or fourth aspect. Accordingly, the method of use of the electrical generator described or implied above may apply to the second or fourth aspects.

According to a fifth aspect of the present invention there is provided an apparatus for extracting energy from fluid motion, comprising a deformable body, wherein at least part of the deformable body comprises at least one conduit arranged to receive an energy medium;

at least part of the deformable body is adapted to be deformed by fluid motion within a fluid body;

the deformable body is arranged such that deformation of the deformable body and/or conduit drives the energy medium; and the energy medium is controllable in order to control at least one dynamic response of the deformable body.

The motion may comprise an oscillating motion.

The energy medium may be a conduit fluid, such as a liquid or gas.

At least one conduit may be deformable. At least one conduit may be adapted to be deformed by fluid motion within the fluid body. At least one conduit may be arranged such that deformation of the conduit drives the energy medium.

The apparatus may comprise at least one energy take-off device. The energy take-off device may comprise a hydraulic pump, a hydraulic electrical generator, a hydraulic actuator, an accumulator or storage device, such as an energy or liquid storage device, or the like, or combinations thereof. The at least one energy take-off device may be coupled to the conduit. The at least one energy take-off device may be adapted to be driven by the energy medium.

The deformable body and/or conduit maybe arranged to continuously drive the energy medium whilst the deformable body and/or conduit is being deformed.

According to a sixth aspect of the present invention there is provided a method of capturing energy from fluid motion, said method comprising the steps of:

providing a deformable body, wherein the deformable body comprises at least one conduit adapted to receive an energy medium, the at least one body being arranged such that deformation of at least part of the body drives the energy medium;

exposing a deformable body to fluid motion;

controlling the energy medium in order to control at least one dynamic response of the deformable body; and permitting the fluid motion to deform at least part of the deformable body to thereby drive the energy medium.

The motion may comprise an oscillating motion.

The energy medium may be a conduit fluid, such as a liquid or gas.

At least one conduit may be deformable. At least one conduit may be adapted to be deformed by fluid motion within the fluid body. At least one conduit may be arranged such that deformation of the conduit drives the energy medium.

The method may further comprise coupling an energy take-off device to the conduit, the energy take-off device being adapted to be driven by the conduit fluid.

The deformable body and/or conduit maybe arranged to continuously drive the energy medium whilst the deformable body and/or conduit is being deformed.

According to a seventh aspect of the present invention is a deformable body made wholly or partly from a flexible, elastic material in which at least one force transducer is embedded or integrally bonded, such that the strain of said elastic material drives the force transducer to effect a useful exchange of energy; and wherein the force transducer is controllable in order to obtain a desired dynamic response of the deformable body.

The deformable body may be configured to enable continuous energy capture from the fluid; and wherein a plurality of force transducers are arranged to continuously deliver energy to the output whilst said body is being deformed.

The body may comprise a plurality of distributed force transducers. This may enable greater redundancy, thereby increasing the resilience of the device.

The distributed transducers may be remotely reconfigurable in the event of loss. This may increase the resilience of the device.

The dynamic response of the deformable body may be controlled by closed or open loop control of the force transducers.

The deformable body may comprise a controller for controlling the force transducer via an energy medium.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

An example of the present invention is described below in the form of an electrical generator for use in converting wave motion to electrical energy. However, it should be understood that this is exemplary only and that the present invention may be utilised to extract energy from any fluid motion, such as current flow, tidal flow, gas flow or the like.

Figure 1:
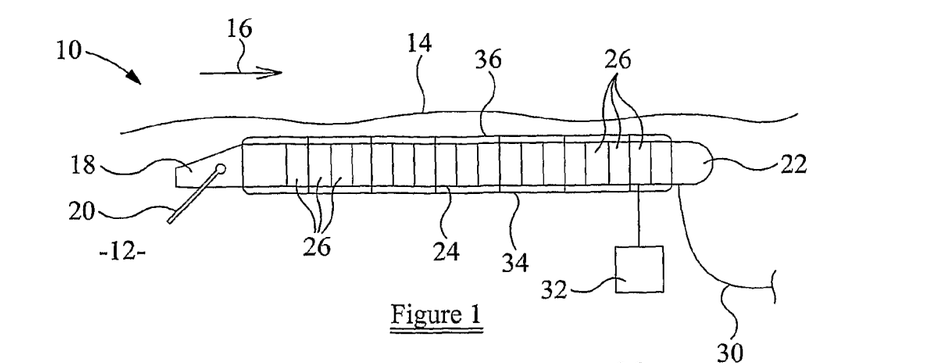
FIG. 1 is a diagrammatic representation of a fluid motion electrical generator in accordance with a first embodiment of the present invention, shown in use within a body of water.
Figure 2A:
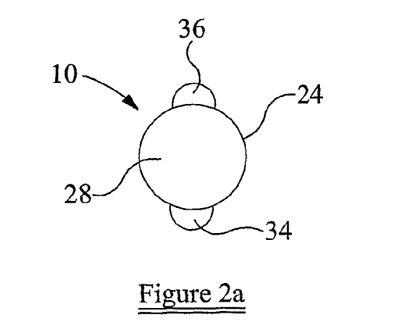
FIG. 2*a* is a lateral cross-sectional view through the electrical generator of FIG. 1, shown in a relaxed configuration.
Figure 2B:
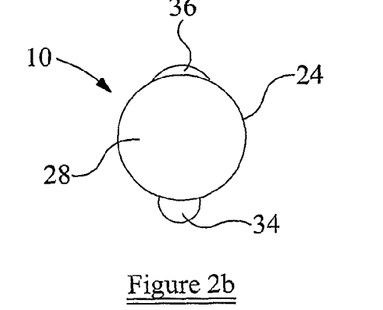
FIG. 2b is a further lateral cross-sectional view through the electrical generator of FIG. 1, shown in a distended configuration.

Reference is first made to FIGS. 1, 2a and 2b of the drawings in which there is shown a fluid motion electrical generator, generally identified by reference numeral 10, in accordance with an embodiment of the present invention. The electrical generator 10 is provided in the form of a wave energy converter adapted to convert wave energy to electrical energy.

The generator 10 is submerged within a body of sea water 12, below the surface 14 thereof, which is subject to wave motion. In the example shown the predominant direction of wave travel is identified by arrow 16. A nose or leading end 18 of the generator 10 is secured to the sea bed (not shown) via a tether 20, and a tail or trailing end 22 is not fixed. The leading and trailing ends 18, 22 in the embodiment shown are buoyant components.

In alternate embodiments, the generator 10 may be arranged to be floating or partially submerged.

The generator 10 comprises a deformable body in the form of a distensible tube 24 with walls comprising a plurality of force transducer panels 26. The force transducer panels are deformable and arranged such that deformation of the force transducer panels drives an energy medium, such as electrical charge and/or a fluid.

In this embodiment, the force transducer panels are formed of an electroactive polymer material. The panel 26 may take the form of a "patch" subject to axial strain and occupying a rectangular volume. For example, one possible panel dimension could be 5.5×1×0.1 m. To maximise the energy abstraction within the physical limits of the materials, the capacitance must be maximised.

Figure 3A:
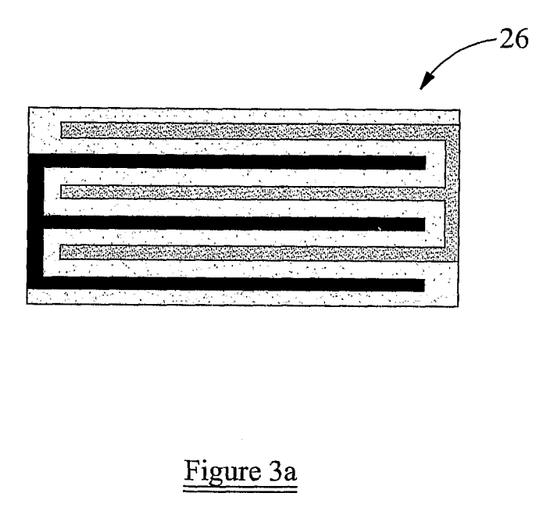
FIG. 3a is a schematic of a force transducer for use with the generator of FIG. 1.

As a first option, as shown in FIG. 3(a), one possible method is to realise the panel 26 as a multi-plate parallel capacitor, where the panel is fabricated as alternate layers of dielectric and electrode laid down one atop the other, and where every second electrode is connected in parallel. As an example, each layer could be of order 10 μm thick.

This panel construction could be fabricated using existing techniques developed for the thin film coatings, and details such as the through connections between alternate electrodes achieved using photolithographic application of masks followed by subsequent etching of dielectric and back filling with the required dielectric or electrode material. This has the advantage of making optimal use of the available rectangular volume. Thus, the first method results in a force transducer panel having a good capacitance and consequential high power rating.

Figure 3B:
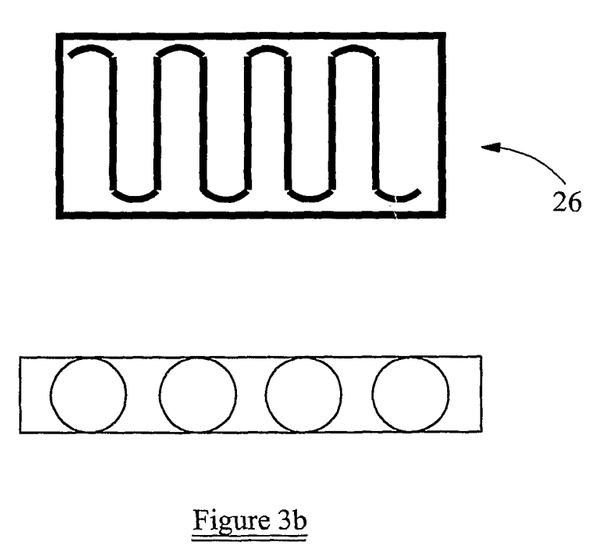
FIG. 3b is a schematic of an alternative force transducer for use with the generator of FIG. 1.

Alternatively, as a second option, as shown in FIG. 3(b), a panel could be created from a single layer capacitor. In this method, the single layer is subsequently rolled into cord, and the patch created by forming the cord into the panel shape. The advantage of such a method is that the manufacture of the electroactive polymer is a single coating process, reducing manufacturing complexity.

The tube 24 defines an inner cavity 28 which contains a fluid, which may be sea water. In use, passing waves across the surface 14 of the water 12 will excite or generate bulge waves which will propagate along the length of the tube 24, causing the tube 24 to distend. Distension of the tube 24 is demonstrated in FIGS. 2 and 3, which are lateral cross-sectional views through the generator 10. In FIG. 2 the tube 24 is shown in a relaxed configuration, and in FIG. 3 the tube 24 is shown in a distended configuration as a result of a passing bulge wave. Distension of the tube 24 in this manner will effect deformation of the panels 26 which, by virtue of the properties of the electroactive polymer material, will cause an electrical current to be generated therein. This generated electrical current may then be conducted from the generator 10 via a cable 30 to, for example, an electrical grid.

This arrangement is particularly advantageous in that the requirement for mechanical power take-off systems is eliminated, along with their associated problems. Additionally, operation of the generator 10 does not rely on the development of extremely large bulge waves to then be discharged through a power take-off system. Instead, the action of the bulge waves continuously generates electrical energy through the panels 26 and as such the energy may be discharged over the length of the tube 24. This in turn permits a lighter device to be utilised. Furthermore, as the generator 10 is a distributed energy system, the generator 10 is more robust, as failure of individual elements of the generator 10 may be compensated for by utilising resources assigned to other elements of the generator 10. Means may be provided for carrying out such re-assignment remotely. Furthermore, in the event of failure of one element, such as a panel 26, the output of the generator 10 is reduced rather than stopped.

The generator 10 is adapted to be tuned in accordance with ambient water conditions, such as predominant wave frequency, velocity or the like. The generator 10 is arranged such that the electric current supplied to the force transducer panels 26 is controllable in order to control at least one dynamic response of the distensible tube 24. In this way, the apparatus 10 operates as a smart structure, that can not only extract energy from fluid motion but also control or adapt the energy extraction, for example, in response to changes in the wave motion or generation requirements placed on the apparatus.

For example, the dynamic response of the tube 24, such as the tube's stiffness, elasticity or the like, may be controllable to permit the bulge wave propagation velocity to be accurately matched with incident wave velocity. This may assist to establish a resonant interaction between the tube 24 and the wave motion, thus maximising the efficiency of the generator 10.

In the embodiment shown, control or adjustment of the mechanical properties of the tube 24 is achieved by active control of the electroactive material of the panels 26. That is, the panels 26 are adapted to receive an electrical current from a control system 32 to effect mechanical changes within the electroactive material. The control system 32 comprises an active system that continuously monitors the strain of the body and applies forces by the panels 26 accordingly to achieve an optimum or preferred output.

The control system 32 may also be utilised to control bulge wave amplitude. Also, the control system 32 may be adapted to initiate bulge waves at the required location and with required amplitude and velocity. The control system 32 may be utilised to dampen the deformation or distensibility of the tube, for example in extreme ambient conditions.

Figure 4:
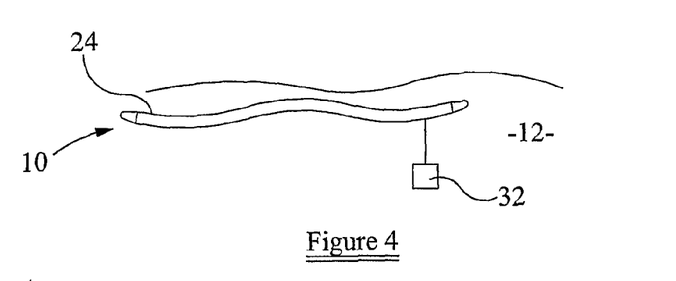
FIGS. 4 and 5 are diagrammatic representations of controlling heaving motion of the electrical generator of FIG. 1 with respect to passing surface waves.
Figure 5:
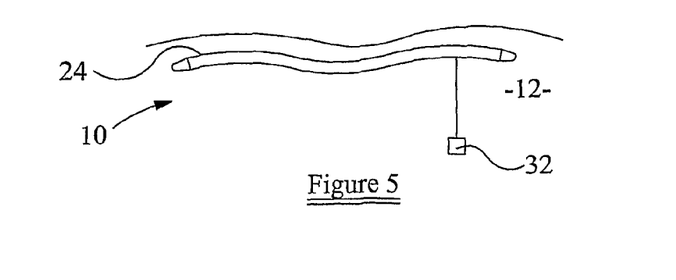

Furthermore, in addition to controlling the deformation or distensibility of the tube 24, the control system 32 may also control the motion of the tube 24. For example, as shown in FIG. 4 the control system 32 may electrically actuate the electroactive polymer material of the panels 26 to enable the tube 24 to oscillate or swim with a harmonic which is out of phase with the passing waves, or which is in phase with the passing waves, as shown in FIG. 5. Control of the motion of the tube 24 in this manner may provide corresponding control over pressure differentials between external wave pressure and fluid pressure within the cavity 28 of the tube 24. This effect may be utilised in addition to or instead of the bulge wave action, with consequent increase in wave power absorption.

Referring again to FIGS. 1, 2a and 2b, the generator 10 further comprises a ballast chamber 34 arranged on a lower surface of the tube 24, and a floatation chamber 36 arranged on an upper surface of the tube 24. The ballast and floatation chambers 34, 36 provide the generator 10 with sufficient buoyancy and assist to maintain the generator 10 in the desired orientation. As shown in FIG. 2b, the outer wall portion of the floatation chamber is flexible but relatively inelastic. Accordingly, when the tube 24 distends the flexible wall will deform to maintain a substantially constant volume to assist to maintain a constant buoyancy. Advantageously, buoyancy is provided at either end 18, 22 of the generator in order to prevent porpoising, i.e. the ends of the generator dipping downward, which may have a detrimental effect on the performance of the generator 10.

In some arrangements, the wall of the floatation chamber 36 may be formed or comprise an electroactive polymer material adapted to be deformed by application of an electrical current thereto. This arrangement may permit the cross-sectional area of the floatation chamber 36 to be varied therealong, which may have the effect of controlling the buoyancy of the tube 24 along its length. This effect may be used to generate preferential motion, such as oscillating motion.

The wall of the flotation chamber 36 may be arranged to have anisotropic properties, such that when the flotation chamber 36 is stretched, the volume of the flotation chamber 36 at the stretched portion is reduced. In this way, at troughs in the tube 24, the fluid within the tube 24 is pressurised due to the hydrostatic head of the fluid in the crest. This pressure results in localised stretching of the walls of the tube at the trough, which thereby reduces the volume of the flotation chambers located at the trough. In this way, the buoyancy at the trough portions of the tube 24 is reduced, thereby amplifying the motion of the tube 24 and thus the energy produced by the generator 10. In this way, the dynamic response of the tube 24 is controlled in a passive manner in addition to the active control provided by the control system 32.

Figure 6:
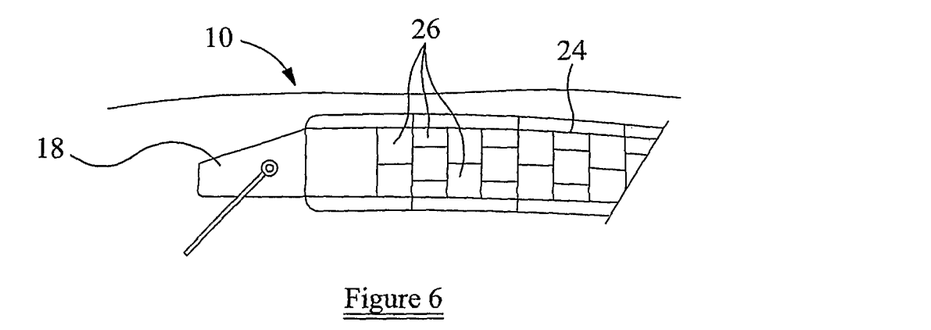
FIG. 6 is an enlarged view of a front end region of the electrical generator of FIG. 1.

Reference is now made to FIG. 6 of the drawings in which there is shown an enlarged view of the leading end 18 of the generator 10. The panels 26 are arranged in overlapping fashion and are orientated relative to the longitudinal and lateral axes of the tube 24. Arranging the panels 26 in this manner may effectively permit control over the motion of the tube 24, and may assist to maximise the electrical energy generated within the electroactive polymer material.

Although not shown in the drawings, one or more of the force transducer panels 26 may be orientated relative to an oblique or diagonal axis of the tube 24. This arrangement may permit torsional control to be achieved.

Figure 7:
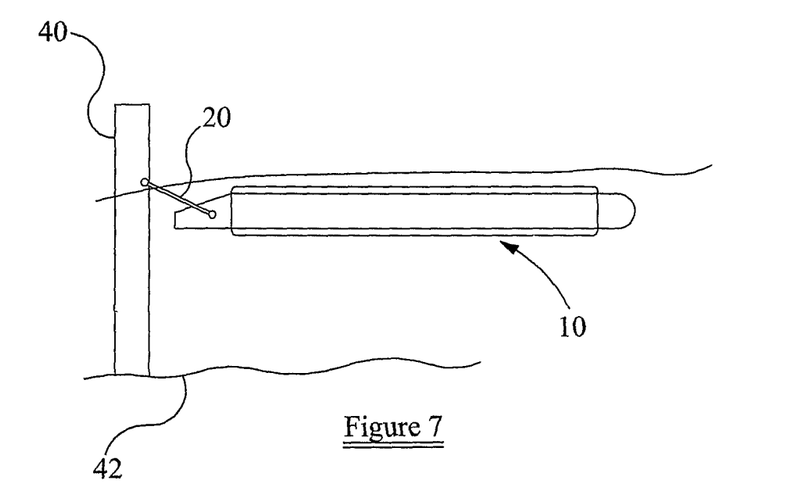
FIG. 7 is a diagrammatic representation of a support arrangement of the electrical generator of FIG. 1.

A mooring arrangement of the generator 10 is shown in FIG. 7, reference to which is now made. In this arrangement the tether 20 is secured to a column 40 which is embedded in the sea bed 42.

Figure 8:
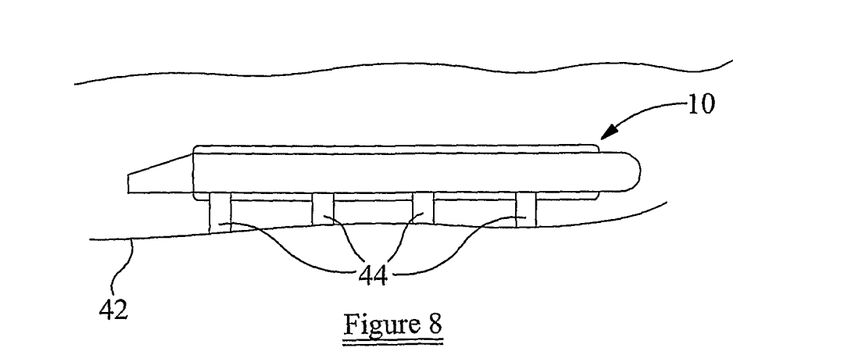
FIG. 8 is diagrammatic representation of an alternative support arrangement of the electrical generator of FIG. 1.

Alternatively, as shown in FIG. 8, the generator 10 may be mounted on a plurality of support members upstanding from the sea bed 42.

The present invention provides a number of advantages over known systems, as noted below.

Energy is extracted along the length of tube, hence avoiding build-up of stored energy which necessitates increase in thickness of walls to accommodate stored energy. Smaller bulges reduce strain hardening and non-linear effects of the tube 24, which improve the operability of the generator 10. As the bulge does not saturate on passive losses, the tube can be increased in length, with a corresponding increase in the energy obtained from the generator 10. Efficiency of the device is increased, as the reduced levels of energy stored in tube walls will also reduce hysteresis losses, and the dynamic responses of the tube 24 can be controlled to minimise reflections forming.

Distensibility or dynamic response of the tube can be controlled by varying response of an electrical control circuit, thus varying the propagation velocity of the bulge wave so as to match each external wave and thereby maximising energy absorption.

Optionally, the distensible tube 24 may be provided with a point absorber (not shown). The point absorber allows improved initiation of bulge waves within the tube 24. The point absorber may be, for example, a resonant piston located at one end of the tube 24 and attached to a buoy floating on the surface and adapted to drive the piston to create a bulge wave within the tube 24.

Therefore, the bulge wave can be initiated at the leading end of the tube by controlled activation of the panels and/or through the action of a point absorber and/or through embedded actuators (not shown), thus accelerating build-up of the bulge wave to optimum size to maximise power absorption from the incident wave. The optimum size of bulge waves will vary according to wave amplitude and frequency.

A bulge wave termination region may be provided at the trailing end 22 of the tube 24 in order to damp the bulge wave and control reflections, which may interfere with subsequent bulge waves in the tube 24.

Power-conversion may be achieved without need for moving mechanical parts. Conversion is achieved entirely with elastomeric polymers and solid-state electronics, thus minimising the need for maintenance.

Power absorption and conversion is entirely self-referencing, thus avoiding need for a fixed frame, as in conventional electroactive polymer material transducers.

It will be possible to pre-stress the wall of the tube to enhance power absorption and performance of the electroactive polymer material. A variety of pre-stressing methods may be employed. For example, pre-stressing may be provided by a chute (not shown) at the trailing end 24 of the tube and/or by anchoring, preferably including active winching or spring loading.

Correct arrangement and cross-coupling of electroactive polymer panels can achieve a swimming action in response to wave forces, either in addition to or instead of the bulge wave action, with consequent increase in wave power absorption.

Inducement of swimming (i.e. vertical harmonic motions) in a vertical plane with a possible phase shift may enhance pressure differentials between external wave pressure and internal tube pressure, thus enhancing power absorption.

The control system 32 is operable to control the dynamic response of the tube 24 in order to minimise or control reflections produced by interaction of the bulge wave with the tube 24.

Reflections can interact with bulge waves in the tube to lower the energy in bulge waves through destructive interference or increase the energy in bulge waves by constructive interference. The control system 32 is operable to control the dynamic response of the distensible tube 24 via control of the force transducer panels 26 and/or actuators in order to minimise reflections from the tube and match the resistive load experienced by a bulge wave as it travels along the tube. In particular, the control system 32 may damp the bulge wave at one or more end of the tube to prevent reflections.

Reflections can also be controlled to produce favourable effects. For example the control system 32 is operable to promote reflections of a controlled frequency from at least one portion of the tube 24. The frequency and wavelength of these reflected waves can be matched to the bulge wave in such a way as to produce constructive interference and enhance the energy of the bulge wave.

The tube 24 is provided with a spatially distributed sensor arrangement (not shown) coupled with the control circuit, for monitoring a dynamic response of the tube 24. For example, the sensors may be separate strain sensors, pressure sensors, flow sensors and/or sensors used to determine derivatives of strain such as speed and acceleration of the tube walls. The sensors may be dedicated sensors and/or the force transducer panels 26 themselves may be used as sensors. By having spatially distributed sensors, the control system 32 is able to determine the properties of the bulge wave before it reaches parts of the distensible tube 24. The control system 32 can therefore adapt the dynamic response of that part of the tube 24 accordingly. Furthermore, the data provided by the sensors can be used to provide a predicted power that could be extracted from the apparatus, which allows for improved control over the extracted power.

Excessive electrical damping in high sea states can de-tune response and thus limit or even stop power absorption as required.

The device of the present invention may be an order of magnitude less expensive than existing wave energy devices which rely on steel, concrete or similar construction materials due to the low density of the material.

The present invention is significantly more efficient with wave power converted directly to electricity with minimum of intermediate steps.

Figure 9:
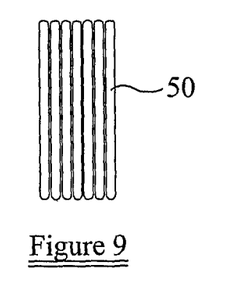
FIG. 9 is a diagrammatic representation of a section of conduit for use in a fluid motion engine according to a second aspect of the present invention.

In a second embodiment of the invention the force transducer comprises one or more conduits arranged to receive a conduit fluid, as shown in FIG. 9. Such a force transducer may be used in place of, or in addition to, the electroactive polymer in the first embodiment. The two embodiments operate in analogous fashion, with the first embodiment using deformation of an electroactive polymer by fluid motion induced by waves to drive a electrical charge whilst the second embodiment uses deformation of conduits by fluid motion induced by waves to drive a fluid in the conduits.

FIG. 9 shows a conduit 50 for mounting on or in the walls of the tube 24 of the generator 10. The conduit 50 is arranged to coil around the inner cavity 28 of the distensible tube 24. In an optional embodiment, the coiled conduit 50 forms the walls of the tube 24 and defines the tube 24. The conduit 50 is coiled such that a wall of a portion of the conduit 50 forming a loop of the coil is affixed to a wall of the conduit 50 belonging to adjacent loops of the coil. The bonding may be, for example, by direct bonding of the conduit or via an intermediate web or by via inner and/or outer walls of the tube 24.

The coiled conduit 50 is constructed to be resiliently elastic, for example by constructing the conduit 50 from a suitable elastic material and/or by appropriately shaping the conduit 50. In the embodiment shown, the conduit 50 is provided with cross braided nylon reinforcement to control the elasticity and increase the burst strength of the conduit 50. The helical relatively inelastic reinforcement confers anisotropic material properties, such that axial strain of the conduit reduces its internal volume.

As in the embodiment of FIG. 1, passing waves across the surface of the water will excite or generate bulge waves, which will propagate along the length of the distensible tube 24, causing the tube 24 to distend.

Figure 10A:
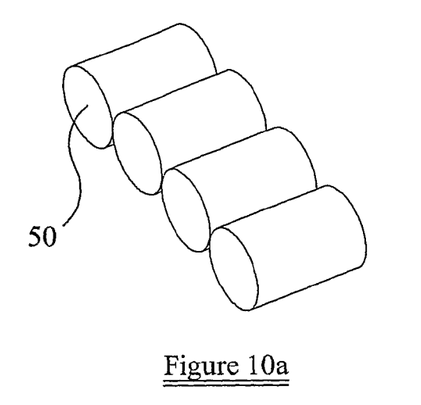
FIGS. 10a and 10b are diagrammatic representations of a panel of the conduit of FIG. 9 in a relaxed and stretched configuration respectively.
Figure 10B:
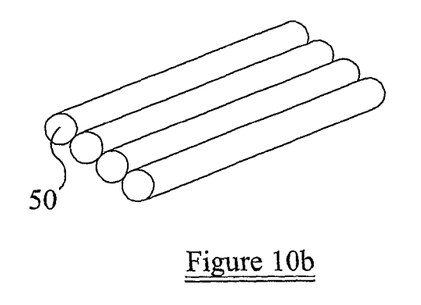
Figure 11A:
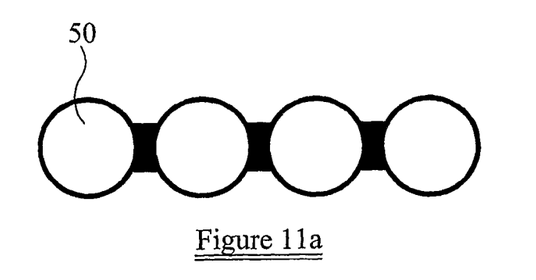
FIGS. 11a and 11b are cross sections of the conduit panels of FIGS. 10a and 10b in a relaxed and stretched configuration respectively.
Figure 11B:
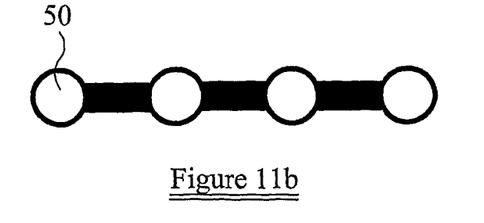

The distension or relaxation of the tube 24 causes respective localised stretching or relaxing of the conduit 50. As the conduit 50 is oriented generally circumferentially around the distensible tube 24, distension and relaxation of the tube 24 causes generally axial stretching and relaxation of the conduit 50. FIGS. 10a and 11a show a conduit panel in a relaxed state. As shown in FIGS. 10b and 11b, localised stretching of the elastically deformable conduit 50 causes the length of the conduit 50 to increase and the volume of the conduit 50 to decrease. The process is reversed when the stretched conduit 50 is relaxed and returns to the state shown in FIGS. 10a and 11a.

This deformation of the conduit 50 applies hydrostatic forces on the fluid contained within the conduit 50, which results in the movement of fluid through the conduit 50. The direction and magnitude of the induced fluid flow in the conduit 50 depends on the sum of the contributions of the local deformations along the length of the conduit 50.

The one or more conduits 50 are connected to a power take-off apparatus (not shown) such as a hydraulic generator, a hydraulic pump or a hydraulic actuator. The power take-off apparatus is arranged to receive, and be driven by movement of, the conduit fluid. The power take-off apparatus is adapted to work in a reversible fashion, i.e. power is extracted from the fluid regardless of the direction in which the fluid travels. Since the system indirectly drives the fluid used fed to the power take-off apparatus via deformation of the force transducer, such as the conduit and/or electroactive polymer, rather than directly using the bulge wave formed in the tube to intermittently drive the power take-off device, the system is operable to provide a more continuous power take-off. This optimises the efficiency of the system.

By having a power take-off apparatus indirectly driven via a secondary fluid located within the conduits, rather than using the fluid flowing in the cavity of the distensible tube 24, more freedom in the location of the power take-off apparatus may be obtained. For example, the power take-off apparatus may be sited on a surface installation for easy access and maintenance whilst the body is submerged or semi-submerged. Furthermore, the conduit fluid may be selected to optimise its use with the power take-off apparatus. For example, the conduit fluid may be less corrosive or contain less foreign bodies that may damage the power take-off apparatus than the fluid in the cavity of the body. In this way, the lifetime of the relatively expensive power take-off apparatus may be increased and maintenance reduced.

In an alternative to using coiled sections of conduit 50, sections of conduit 50 may be arranged into panels 52, as shown in FIGS. 10a, 10b, 11a and 11b. Each panel 52 comprises one or more conduits 50 arranged side by side. The considerations of panel location and orientation described in relation to the embodiment of FIG. 1 apply equally to this embodiment.

Each conduit 50 or section of conduit 50 is provided with one-way valves (not shown). Each conduit 50 is arranged to pump in parallel into a pressure main. As an alternative option, each of the conduits 50 or sections of conduit 50 can be arranged in series to operate as a multi-stage pump.

As with the first embodiment, the properties and motion of the distensible tube 24 can be controlled, in this case by controlling the operating pressure of the conduits 50. This can be achieved, for example, by operating the energy take off apparatus in reverse to increase the pressure of the conduits 50, or by providing separate pumps.

By providing a power generator that operates as a smart structure, increased controllability of the generator is possible. In this way, the generator can adapt to changing wave conditions, optimising the dynamic response of the generator to suit the prevalent wave conditions and increasing or damping the performance of the generator to provide a smooth energy output and protect against damage due to operation in extreme conditions.

The power generator described above provides a wide range of control options, including both active and passive control, and control of reflections generated within the generator body, which allow a wide range of control options to be achieved and greatly increase the flexibility of the apparatus.

It should be understood that the embodiment described herein is merely exemplary and that various modifications may be made thereto without departing from the scope of the present invention. For example, as noted above, the present invention may be used to extract energy from any source of fluid motion, as long as the body oscillates.

Additionally, the generator/energy take-off apparatus is not limited to the use of a tube, and may comprise any other suitably shaped structure. Furthermore, the leading and training ends of the tube may or may not be extendible, and may or may not comprise an electroactive polymer material or conduit.

Furthermore, the tube or electroactive polymer material or conduit walls may incorporate flexible but inelastic fibres to permit the distensibility in one or more preselected dimensions, thus enabling further control of shape or response. Incorporation of such protection allows thinner and stiffer wall materials to be produced. In addition, the fibres can be made conducting to improve power collection and take-off. Selection of suitable fibres may also protect against damage to the tube 24.

In addition, although the conduits are described above as being tubular, in practice they may take other forms, such as a series of interlinked fluid chambers.

The invention claimed is:

1. An apparatus for extracting energy from fluid motion, said apparatus comprising:
   a deformable body adapted to be deformed by fluid motion, wherein the deformation of the deformable body is arranged to drive at least one energy medium to be delivered to an energy output;
   the deformable body comprising a distensible tube whose wall comprises a plurality of force transducers along the length of the tube;
   the force transducers comprising an electroactive material and being arranged such that deformation of the force transducers drives the energy medium; and
   wherein the energy medium is controllable in order to control at least one dynamic response of the deformable body.

2. An apparatus as claimed in claim 1, wherein the apparatus comprises tuning elements for controlling a resonant point of the energy medium to match a desired forcing frequency.

3. An apparatus as claimed in claim 1, wherein the apparatus comprises a controller, and the controller is arranged to tune a dynamic response of the deformable body.

4. An apparatus as claimed in claim 1, wherein the force transducer is controllable to obtain a selected dynamic response of the deformable body.

5. An apparatus as claimed in claim 1, wherein the controller is in communication with at least one sensor for sensing a dynamic response of the deformable body and the controller is arranged to control the dynamic response of the system at least partially based on the output of at least one sensor.

6. An apparatus as claimed in claim 1, wherein the apparatus comprises at least one actuator for displacing at least part of the deformable body.

7. An apparatus as claimed in claim 1, wherein the electroactive material comprises an electroactive polymer material.

8. An apparatus according to claim 1, wherein the force transducer comprises at least one deformable conduit arranged to receive a fluid.

9. An apparatus according to claim 8, wherein the at least one conduit is provided with one or more valves and at least one of the valves is a one way valve and/or at least one of the valves is a throttle valve.

10. The apparatus according to claim 1, wherein the apparatus is adapted to be driven or actuated by motion of a liquid, such as by wave motion, tidal motion, fluid currents, cascading fluids or the like, or any combinations thereof.

11. The apparatus according to claim 1, wherein the deformable body is adapted to be at least partially submerged within a fluid body subject to fluid motion.

12. The apparatus according to claim 1, wherein the deformable body defines a fluid cavity adapted to contain a fluid, wherein forces acting on an outer surface of the deformable body result in changes in pressure within the contained fluid, thus effecting deformation of the deformable body and at least one force transducer.

13. The apparatus according to claim 1, wherein the deformable body is adapted to permit the creation of bulge waves therein resulting from the effect of fluid forces acting against the deformable body.

14. The apparatus according to claim 13, wherein the apparatus further comprises a point absorber, arranged to initiate a bulge wave; or
   at least one force transducer or at least one actuator is operable to initiate a bulge wave.

15. The apparatus according to claim 1, wherein the deformable body functions as a-waveguide for controlling propagation of a bulge wave therein.

16. The apparatus according to claim 15, wherein the properties, dimensions, shape of the body when functioning as a waveguide, or combinations thereof, may be arranged to minimize reflections.

17. The apparatus according to claim 16, wherein the body when functioning as a waveguide is operative to control or generate reflections so as to promote a particular frequency of a bulge wave or increase passive bandwidth of the deformable body.

18. The apparatus according to claim 1, wherein a wall of the deformable body comprises or supports a plurality of panels, the panels comprising at least one force transducer, the plurality of panels being oriented in specific patterns to assist in at least one of maximizing driving of the energy medium, and providing preferential control of the deformation of the deformable body.

19. The apparatus according to claim 1, wherein the force transducer comprises at least one conduit and the at least one conduit is adapted to be pressurized by pressure control means to control a dynamic response of the at least one conduit and thus of the deformable body.

20. The apparatus according to claim 1, wherein the distensible tube is configured to receive a second fluid, the tube being adapted so as to be at least partially placeable within the first fluid, and
wherein at least one of the transducers is operable to transfer energy from the first or second fluid, or to vary of the effective elasticity of the tube walls, so that the velocity of propagation of bulge or pressure waves along the tube can be varied.

21. An apparatus for extracting energy from fluid motion, said apparatus comprising:
a deformable body adapted to be deformed by fluid motion, wherein the deformation of the deformable body is arranged to drive at least one energy medium to be delivered to an energy output;
the deformable body comprising a distensible tube whose wall comprises a plurality of force transducers along the length of the tube;
the force transducers comprising an electroactive material and being arranged such that deformation of the force transducers drives the energy medium;
wherein the energy medium is controllable in order to control at least one dynamic response of the deformable body; and
wherein the plurality of force transducers is orientated circumferentially around the tube.

22. An apparatus for extracting energy from fluid motion, said apparatus comprising:
a deformable body adapted to be deformed by fluid motion, wherein the deformation of the deformable body is arranged to drive at least one energy medium to be delivered to an energy output;
the deformable body comprising a distensible tube whose wall comprises a plurality of force transducers along the length of the tube;
the force transducers comprising an electroactive material and being arranged such that deformation of the force transducers drives the energy medium;
wherein the energy medium is controllable in order to control at least one dynamic response of the deformable body; and
wherein the deformable body comprises fibers aligned in preferential directions so as to permit distensibility in one or more preselected dimensions.

23. An apparatus for extracting energy from fluid motion, said apparatus comprising:
a deformable body adapted to be deformed by fluid motion, wherein the deformation of the deformable body is arranged to drive at least one energy medium to be delivered to an energy output;
the deformable body comprising a distensible tube whose wall comprises a plurality of force transducers along the length of the tube;
the force transducers comprising an electroactive material and being arranged such that deformation of the force transducers drives the energy medium;
wherein the energy medium is controllable in order to control at least one dynamic response of the deformable body; and
wherein the force transducers comprise a multi-parallel plate capacitor, wherein alternate layers of dielectric and electrode are laid down one on top of the other and where every second electrode is connected in parallel.

24. An apparatus for extracting energy from fluid motion, said apparatus comprising:
a deformable body adapted to be deformed by fluid motion, wherein the deformation of the deformable body is arranged to drive at least one energy medium to be delivered to an energy output;
the deformable body comprising a distensible tube whose wall comprises a plurality of force transducers along the length of the tube;
the force transducers comprising an electroactive material and being arranged such that deformation of the force transducers drives the energy medium;
wherein the energy medium is controllable in order to control at least one dynamic response of the deformable body; and
wherein the force transducer comprises an electro-active material, the force transducer being arranged such that deformation of the force transducer drives the energy medium and the force transducer is also operable as a sensor.

25. An apparatus for extracting energy from fluid motion, said apparatus comprising:
a deformable body adapted to be deformed by fluid motion, wherein the deformation of the deformable body is arranged to drive at least one energy medium to be delivered to an energy output;
the deformable body comprising a distensible tube whose wall comprises a plurality of force transducers along the length of the tube;
the force transducers comprising an electroactive material and being arranged such that deformation of the force transducers drives the energy medium;
wherein the energy medium is controllable in order to control at least one dynamic response of the deformable body; and
wherein the dynamic response of the tube is controllable to permit the bulge wave propagation velocity to be accurately matched with an incident wave velocity.

* * * * *